United States Patent
Piel et al.

(10) Patent No.: US 10,013,300 B2
(45) Date of Patent: Jul. 3, 2018

(54) METHOD AND DEVICE FOR THE ON-BOARD DIAGNOSIS OF A CONTROL UNIT INCLUDING A HYPERVISOR AND AT LEAST ONE GUEST SYSTEM OPERATED UNDER THE HYPERVISOR

(71) Applicant: Robert Bosch GmbH, Stuttgart (DE)

(72) Inventors: Gunnar Piel, Hemmingen (DE); Gary Morgan, Thixendale (GB)

(73) Assignee: ROBERT BOSCH GMBH, Stuttgart (DE)

( * ) Notice: Subject to any disclaimer, the term of this patent is extended or adjusted under 35 U.S.C. 154(b) by 64 days.

(21) Appl. No.: 15/222,410

(22) Filed: Jul. 28, 2016

(65) Prior Publication Data

US 2017/0031746 A1 Feb. 2, 2017

(30) Foreign Application Priority Data

Jul. 29, 2015 (DE) ......................... 10 2015 214 376

(51) Int. Cl.
| | |
|---|---|
| *G06F 11/00* | (2006.01) |
| *G06F 11/07* | (2006.01) |
| *G05B 23/02* | (2006.01) |
| *G06F 11/22* | (2006.01) |

(52) U.S. Cl.
CPC ............ *G06F 11/079* (2013.01); *G05B 23/02* (2013.01); *G06F 11/0712* (2013.01); *G06F 11/0739* (2013.01); *G06F 11/0751* (2013.01); *G06F 11/0787* (2013.01); *G06F 11/22* (2013.01)

(58) Field of Classification Search
USPC .......................................................... 714/30
See application file for complete search history.

(56) References Cited

U.S. PATENT DOCUMENTS

| | | | |
|---|---|---|---|
| 6,622,263 B1 * | 9/2003 | Stiffler ............... | G06F 11/1469 711/135 |
| 6,782,313 B1 | 8/2004 | Frech et al. | |
| 2006/0294425 A1 * | 12/2006 | Kollner ............... | G01R 31/025 714/30 |
| 2010/0037096 A1 * | 2/2010 | Bum .................. | G06F 11/1438 714/19 |
| 2011/0246986 A1 * | 10/2011 | Nicholas ............. | G06F 11/0712 718/1 |
| 2013/0138995 A1 * | 5/2013 | Sivaramakrishnan | G06F 11/2043 714/4.2 |
| 2013/0275805 A1 * | 10/2013 | Harper ............... | G06F 11/1438 714/16 |

(Continued)

FOREIGN PATENT DOCUMENTS

DE 199 21 845 A1 11/2000

*Primary Examiner* — Sarai E Butler
(74) *Attorney, Agent, or Firm* — Norton Rose Fulbright US LLP; Gerard Messina

(57) ABSTRACT

A method for the on-board diagnosis of a control unit which include a hypervisor and at least one guest system operated under the hypervisor. In the method, the guest system receives a diagnosis inquiry at an individual diagnosis address of the guest system from a diagnostic tool with the aid of a communication infrastructure. The guest system makes a self-diagnosis. The guest system receives a hypervisor diagnosis from the hypervisor. The guest system transmits, at its diagnosis address, the self-diagnosis or the hypervisor diagnosis to the diagnostic tool as a function of the diagnosis inquiry.

11 Claims, 2 Drawing Sheets

(56) References Cited

U.S. PATENT DOCUMENTS

| | | | |
|---|---|---|---|
| 2015/0261660 A1* | 9/2015 | Shiraishi | G06F 11/3688 714/38.1 |
| 2015/0317243 A1* | 11/2015 | Green | G06Q 20/127 714/38.1 |
| 2016/0254964 A1* | 9/2016 | Benc | H04L 41/0853 709/223 |

* cited by examiner

METHOD AND DEVICE FOR THE ON-BOARD DIAGNOSIS OF A CONTROL UNIT INCLUDING A HYPERVISOR AND AT LEAST ONE GUEST SYSTEM OPERATED UNDER THE HYPERVISOR

CROSS REFERENCE

The present application claims the benefit under 35 U.S.C. § 119 of German Patent Application No. DE 102015214376.7 filed on Jul. 29, 2015, which is expressly incorporated herein by reference in its entirety.

FIELD

The present invention relates to a method for the on-board diagnosis of a control unit including a hypervisor and to at least one guest system operated under the hypervisor. The present invention moreover relates to a corresponding device, to a corresponding computer program, and to a corresponding storage medium.

BACKGROUND INFORMATION

Conventional vehicle control units generally have capabilities for on-board diagnosis. The supplied diagnosis typically refers to the control unit itself, its function, and software updates. These capabilities of control units of the type in question may be accessed, for example, with the aid of a wide variety of vehicle communication networks such as CAN, Flexray or Ethernet and respective diagnostic protocols such as OBD. To establish a diagnostic communication link between the control unit and an external diagnostic tool, such a control unit has a diagnosis address. In a single software system within the control unit, the described capabilities shall be considered to be part of the related art.

In a virtualized control unit, however, there are several software systems, so-called guest systems, and the additional software component of a hypervisor. As a consequence, diagnostic capabilities with respect to status information are needed for each guest system, the hardware and the hypervisor. Finally, the guest systems and the hypervisor must be updated.

German Patent Application No. DE 19921845 A1 describes a diagnostic testing device for motor vehicles, programmable control units including self-diagnosis means being provided in the motor vehicle, which control and monitor the engine control unit and other systems of the motor vehicle in a program-controlled manner, generate error codes and store these, and which are connectable to an external diagnostic tester via a motor vehicle-side diagnostic/test plug. The external diagnostic tester is equipped with a program identification and program loading device. With the aid of the program identification device, the program version present in the connected control unit is queried and identified. When the program which is present in the motor vehicle and identified via the diagnostic/test plug and present in the connected control unit of the motor vehicle is not stored in the latest and most up-to-date version, the program loading device of the diagnostic tester loads the respective most up-to-date version into the program memory of the corresponding control unit.

SUMMARY

The present invention provides a method for the on-board diagnosis of a control unit including a hypervisor and at least one guest system operated under the hypervisor, a corresponding device, a corresponding computer program, and a corresponding storage medium as recited in the independent claims.

One advantage of this approach lies in the option that it provides diagnostic information about the control unit hardware, each guest system, and the hypervisor. In contrast to an obvious representation of the pieces of status information at a single diagnosis address, as would be achievable by sharing and relaying pieces of information between the software instances, the proposed approach provides separate and independent means for each guest system, and is thus consistent with the principle of separation and independence between the guest systems.

Each guest system thus has a dedicated diagnosis address and provides its own diagnostic information. The communication infrastructure may either be shared between multiple guest systems or reserved exclusively for one guest system. The pieces of diagnostic information about shared components such as the hypervisor are provided to each guest system. This ensures that pieces of diagnostic information about shared components are available at the diagnosis address of each guest system. This also ensures redundancy when one guest system fails and is no longer able to provide diagnostic information.

BRIEF DESCRIPTION OF THE DRAWINGS

Exemplary embodiments of the present invention are shown in the figures and are described in greater detail below.

DETAILED DESCRIPTION OF EXAMPLE EMBODIMENTS

Figure 1:
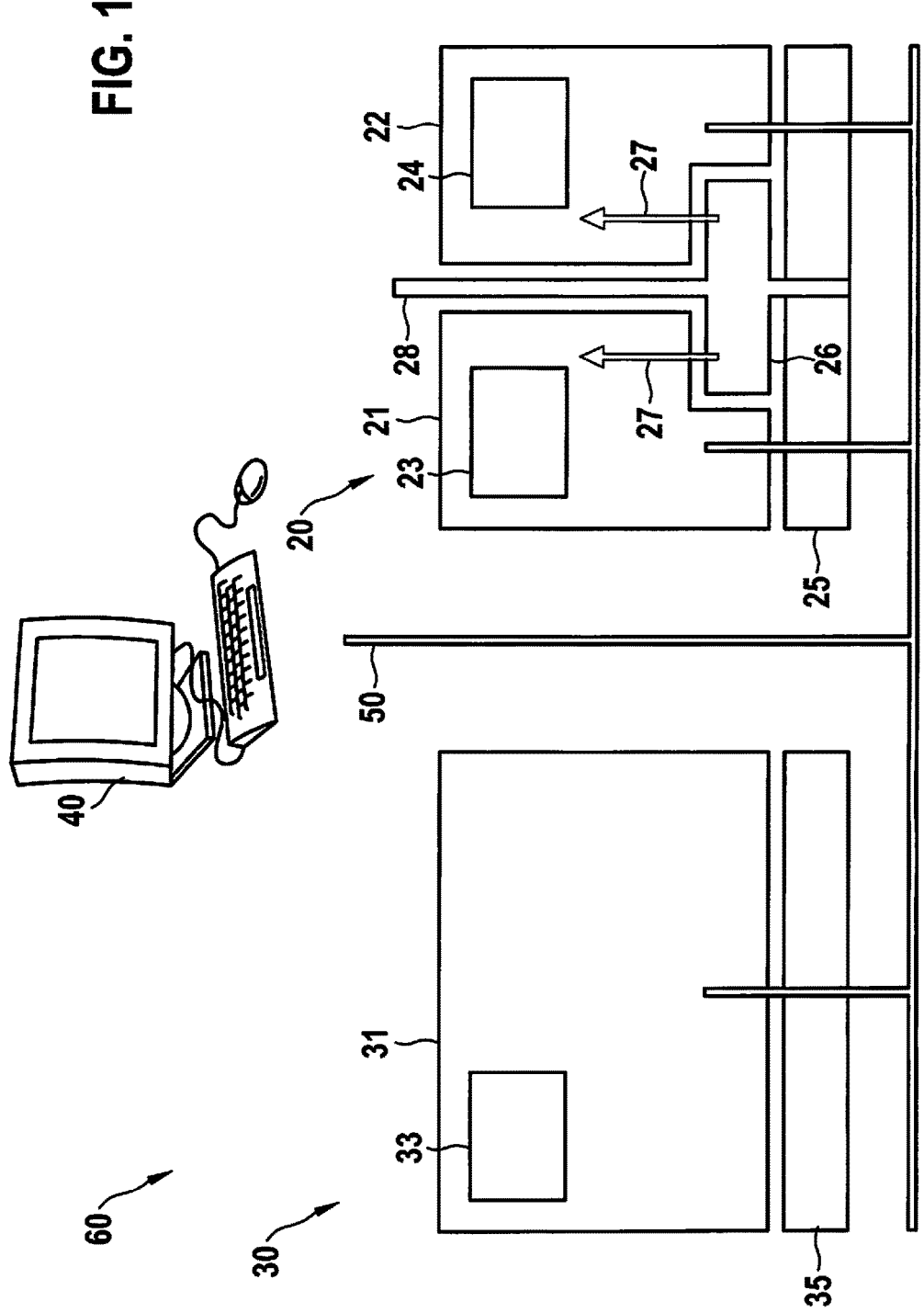
FIG. 1 shows the flow chart of a method according to one specific embodiment of the present invention.
Figure 2:
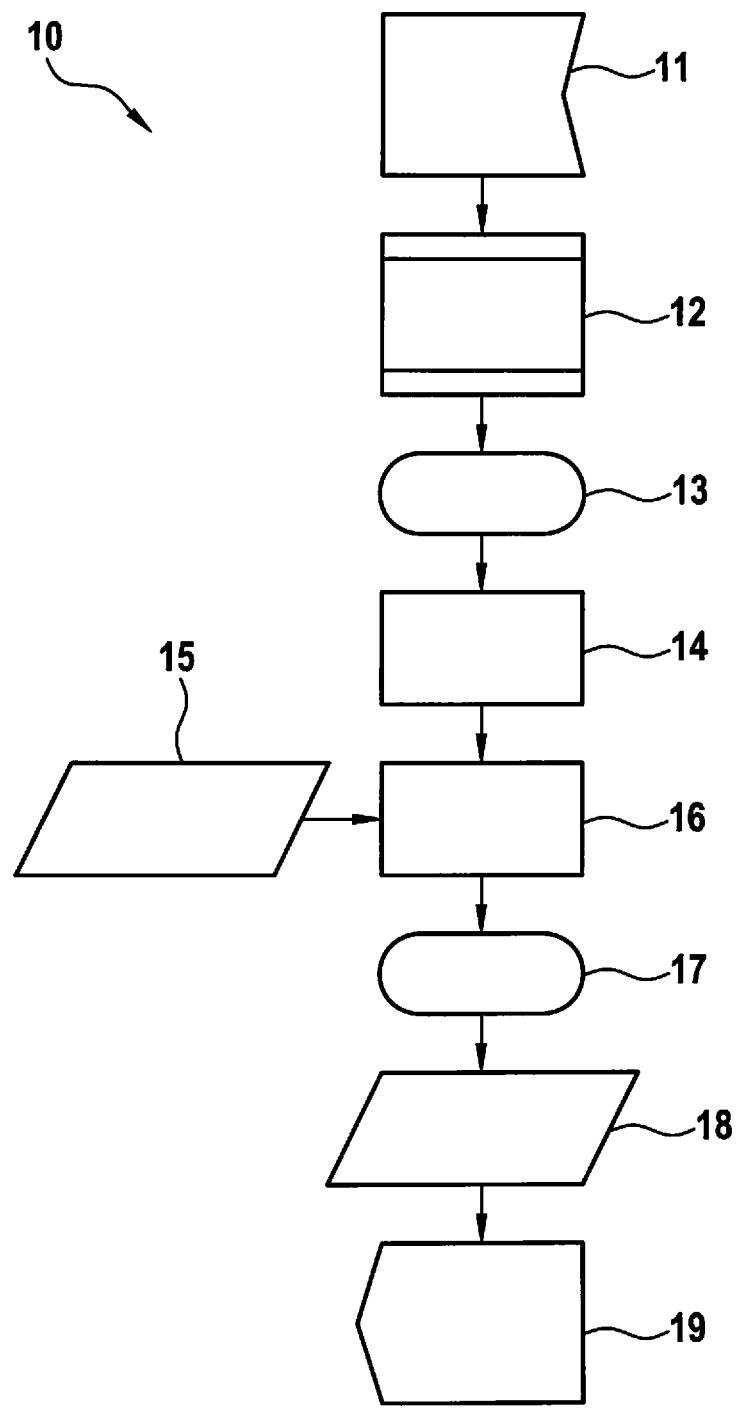
FIG. 2 shows the block diagram of a control unit and its communication partners, in which the method according to FIG. 1 is used.

FIG. 1 illustrates the basic sequence of a method 10 for on-board diagnosis 15, 18, 27 in a virtualized system, which shall now be described in greater detail based on the exemplary system landscape 60 according to FIG. 2.

While a conventional control unit 30 executes only a software 31 having a single diagnosis address 33 on its hardware platform 35, in the case of virtualized control unit 20 first guest system 21 operated under hypervisor 26 has a first diagnosis address 23, and second guest system 22, also operated under hypervisor 26, has a second diagnosis address 24. Both first guest system 21 and second guest system 22 are thus able to pursue diagnostic communication.

Both guest systems 21, 22 are furthermore able to make, process and provide a self-diagnosis 14 which is based on their respective software functionality and assigned hardware resources 25.

Hypervisor 26 is responsible for making a diagnosis 15, 18, 27 which is based on its internal processes and the general behavior of first guest system 21 and of second guest system 22. It is possible, for example, that a guest system 21, 22 which violated the assigned partition boundary 28 was started or stopped.

In the hypervisor configuration, first guest system 21 and second guest system 22 were granted the rights to retrieve the aforementioned hypervisor diagnosis 15, 18, 27 from hypervisor 26. It is also possible to inform first guest system 21 or second guest system 22 about an update of hypervisor diagnosis 15, 18, 27 with the aid of a general trigger mechanism of hypervisor 26.

One of guest systems 21, 22, which is queried about the pieces of diagnostic information regarding shared components such as hypervisor 26, makes these available at its diagnosis address 23, 24.

By accepting security losses, it is also possible to assign a dedicated diagnosis address to hypervisor 26. As an alternative for particularly powerful control units, furthermore a separate administrative or monitoring partition which is in charge of all diagnostics may be considered.

What is claimed is:

1. A method for an on-board diagnosis of a control unit including a hypervisor and first and second guest systems operated under the hypervisor, the method comprising:
   receiving, by the first guest system, a diagnosis inquiry at an individual diagnosis address of the first guest system from a diagnostic tool with the aid of a communication infrastructure;
   making, by the first guest system, a self-diagnosis;
   receiving, by the first guest system and from the hypervisor, a hypervisor diagnosis regarding functionality of the hypervisor, which the hypervisor sends to each of the first and second guest systems; and
   transmitting, by the first guest system at its diagnosis address, the self-diagnosis and the hypervisor diagnosis to the diagnostic tool in response to the diagnosis inquiry.

2. The method as recited in claim 1, wherein the self-diagnosis refers to a software function of the first guest system.

3. The method as recited in claim 1, wherein the self-diagnosis refers to hardware resources assigned to the first guest system.

4. The method as recited in claim 3, wherein the hypervisor diagnosis refers to internal processes of the hypervisor.

5. The method as recited in claim 4, wherein the hypervisor diagnosis refers to a characteristic of a sharing of resources between the and second guest systems.

6. The method as recited in claim 5, wherein the first guest system requests the hypervisor diagnosis from the hypervisor.

7. The method as recited in claim 6, wherein the hypervisor diagnosis is automatically initiated by the hypervisor.

8. The method as recited in claim 1, wherein hypervisor diagnosis is a self-diagnosis of the hypervisor performed by the hypervisor.

9. The method as recited in claim 1, wherein the hypervisor diagnosis is performed without any crash of the first and second guest systems.

10. A non-transitory machine-readable storage medium on which is stored a computer program for an on-board diagnosis of a control unit including a hypervisor and first and second guest systems operated under the hypervisor, the computer program, when executed by a processor, causing the processor to perform a method, the method comprising:
    causing the first guest system to receive a diagnosis inquiry at an individual diagnosis address of the first guest system from a diagnostic tool with the aid of a communication infrastructure;
    causing the first guest system to make a self-diagnosis;
    causing the first guest system to receive from the hypervisor a hypervisor diagnosis regarding functionality of the hypervisor, which the hypervisor sends to each of the first and second guest systems; and
    causing the first guest system to transmit, at its diagnosis address, the self-diagnosis and the hypervisor diagnosis to the diagnostic tool in response to the diagnosis inquiry.

11. A device for an on-board diagnosis of a control unit including a hypervisor and first and second guest systems operated under the hypervisor, the device designed to:
    cause the first guest system to receive a diagnosis inquiry at an individual diagnosis address of the first guest system from a diagnostic tool with the aid of a communication infrastructure;
    cause the first guest system to make a self-diagnosis;
    cause the first guest system to receive from the hypervisor a hypervisor diagnosis regarding functionality of the hypervisor, which the hypervisor sends to each of the first and second guest systems; and
    cause the first guest system to transmit, at its diagnosis address, the self-diagnosis and the hypervisor diagnosis to the diagnostic tool in response to the diagnosis inquiry.

* * * * *